Figure 1:
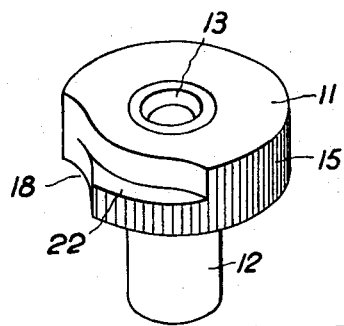

Jan. 28, 1964   C. S. ROBERTS ETAL   3,119,287
JIG BUSHES
Filed Oct. 26, 1960

INVENTORS
Colin Samuel Roberts &
John George William Jackson
BY
ATTORNEY

3,119,287
JIG BUSHES
Colin Samuel Roberts, 178 Gossops Drive, Gossops
 Green, Crawley, England, and John George William
 Jackson, 28 Cook Road, Tilgate, Crawley, England
Filed Oct. 26, 1960, Ser. No. 65,079
Claims priority, application Great Britain Oct. 27, 1959
7 Claims. (Cl. 77—62)

This invention relates to bushes for fitting into a jig to guide a tool or tool holder in relation to a workpiece.

Such bushes essentially comprise a sleeve which is a close fit in a hole in the jig and the bore of which is an easy fit about a tool such as a drill, reamer or tap or the stem of a tool holder such as a boring bar, and a head which serves to locate the bush axially. The head of the drill bush is usually integral and of considerably greater diameter than the sleeve and usually incorporates an annular step and a securing formation to allow the bush to be held in place. Moreover since the securing formation is usually such that the bush is positioned by putting it in place and rotating it about its axis the periphery of the head is usually knurled. In consequence the usual jig bush is of relatively complex shape and it is the machining of the head to shape and the machining of the sleeve to size with the head integral that accounts for the greater part of the cost of a bush, particularly since the bush must be of a hard material so that it will not be unduly rapidly worn by a tool or tool holder passing through it.

It is an object of the present invention to provide a jig bush which can be made more simply than the conventional article and which is as a result cheaper.

According to the invention a jig bush is provided comprising a head portion and a sleeve portion, the sleeve portion being made of a hard steel and the head portion being permanently fixedly secured to the sleeve portion by being moulded onto the sleeve portion.

The two part construction of the bush allows the head portion to be made of an easily worked material so that the cost of forming the head portion to shape is low. At the same time the sleeve portion uses less material and may be of simple construction so that the amount of machining of the hard material of which the sleeve is made is reduced to a minimum.

The head portion should be cast or moulded onto the sleeve portion. The head portion may then be of any suitable material which can be cast or moulded to the desired shape and which will adhere to keying provided on the sleeve portion. Preferred materials are polystyrene, Styrex, butadiene Styrex, nylon, acetyl resin, thermosoftening or thermosetting phenolic resins, hard natural or synthetic rubber or any material which can be moulded or cast. Alternatively the head may be of a suitable diecasting alloy. Other possible materials are sintered metal powders or so-called hard metal powders e.g. tungsten carbide bound in a matrix.

A further advantage of using a head of a moulded or cast synthetic material is that this material may be coloured and this allows the colours to be coded to indicate the size of tool with which the bush is to be used. This will facilitate differentiation between bushes of only slightly different sizes and also allow an operator to see at once which holes in a jigged workpiece are to be machined with a particular size of tool.

It is preferred that the thickness of the head portion should not exceed half the length of the bush. Generally the head will be of greater diameter than the sleeve. For certain applications however it is desirable that the head should be of no greater diameter than the remainder of the bush and in such cases a portion of the sleeve periphery is cut away in the region of one end and the head is formed in this cut away.

Figure 2:
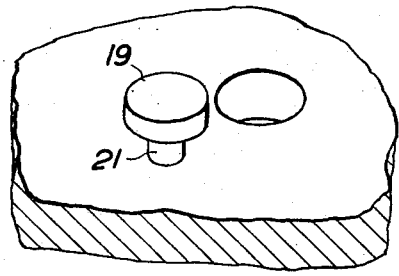
Figure 2:
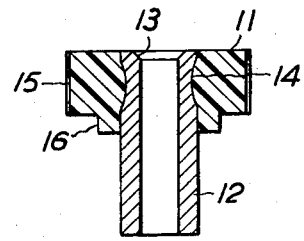

In order that the invention may clearly understood an embodiment thereof will now be described, by way of example only, with reference to the accompanying diagrammatic drawings in which:

FIGURE 1 is a perspective view of a drill bush according to the invention showing sufficient of a jig to indicate how it is held in place, and, FIGURE 2 is a section through the bush of FIGURE 1.

The drill bush shown in the drawings comprise a head portion 11 and a sleeve portion 12. The sleeve portion 12 is made of a hard steel and has an internal diameter which is a clearance fit about the size of drill with which it is to be used. The entry end of the bore is coned at 13 to assist the location of the drill in the bush. The outer periphery 14 of the head end of the sleeve may be splined, threaded, knurled or axially grooved at intervals about its periphery in order to strengthen the keying of the moulded head 11 to the sleeve.

The head 11 which is of synthetic material moulded onto the sleeve 12 has its periphery 15 knurled. The lower surface of the head is formed with an annular step 16 which abuts the surface of the jig when the bush is in place. This results in a space being left between the periphery of the head and the jig into which a tool can be inserted to lift the bush from the jig. The periphery of the head is also cut away at 18 to pass the head 19 of a stud 21 carried on the jig, and the adjacent upper part of the head is cut away to provide a ledge 22 which can be engaged under the head 19 of the stud 21 by rotating the bush about its axis, to retain the bush in position. If desired the surface of the ledge 22 may be inclined at a slight angle to allow the bush to be jammed in a rigid position and the axial surface of the cutaway may be shaped to engage the periphery of the head 19 to restrain the bush from being too easily disengaged.

The head 11 may be moulded in any suitable material and may be coloured to indicate the size of the drill with which the bush is to be used.

We claim:
1. A removable jig bush comprising a sleeve portion and an enlarged head portion, the sleeve portion being formed of a hard steel and the head portion being formed of a relatively softer material permanently secured to one end of the sleeve portion by being cast thereon, whereby said jig bush is adapted to be inserted in an aperture in a jig from one side thereof, said head portion being provided with a peripheral recess forming a passage and a locking surface for receiving a headed retaining member on the top surface of the jig for detachably retaining the jig bush in position.

2. A bush according to claim 1 in which the head portion is a mouldable synthetic material selected from the group consisting of polystyrene, Styrex, butadiene Styrex, nylon, acetyl resin, thermosoftening and thermosetting phenolic resin, and synthetic rubber.

3. A bush according to claim 1, in which the head portion is of die cast alloy.

4. A bush according to claim 1, in which the head portion is of sintered metal powder.

5. A bush according to claim 1, in which the head portion is of hard metal powder bound in a matrix.

6. A bush according to claim 1, in which a key is provided on the sleeve portion to increase the mechanical strength of the bond between the head and sleeve portion.

7. A bush according to claim 1, in which the head portion is solidly coloured throughout to indicate the size of the hole in the sleeve.

References Cited in the file of this patent

UNITED STATES PATENTS

| | | |
|---|---|---|
| 2,766,083 | Fisher | Oct. 9, 1956 |
| 2,915,926 | Woerner | Dec. 8, 1959 |
| 2,920,509 | Bennett | Feb. 12, 1960 |
| 2,942,500 | Conner | June 28, 1960 |